United States Patent Office 3,249,603
Patented May 3, 1966

3,249,603
NOVEL PYRIMIDINE SULFANILAMIDES AND
PROCESSES FOR THEIR PREPARATION
Hermann Bretschneider and Wilhelm Richter, Innsbruck,
Austria, assignors to Hoffmann-La Roche Inc., Nutley,
N.J., a corporation of New Jersey
No Drawing. Filed Aug. 2, 1961, Ser. No. 128,674
Claims priority, application Switzerland, Aug. 9, 1960,
8,894/60; Mar. 17, 1961, 3,267/61
14 Claims. (Cl. 260—239.75)

The present invention relates to sulfanilamide derivatives and more particularly to 4-sulfanilamido-5,6-dialkoxypyrimidines and to processes for their preparation.

One feature of the invention relates to novel 4-sulfanilamido-5,6-dialkoxypyrimidines having the formula (I)

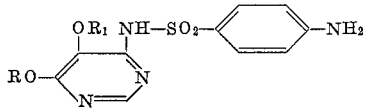

wherein R and $R_1$ are the same or different and are lower alkyl groups, e.g. methyl, ethyl, isopropyl, butyl, etc., with methyl preferred for both R and $R_1$.

These compounds are amphoteric in nature, and can be converted to their acid addition salts by the use of a pharmaceutically acceptable strong acid, for example, hydrochloric acid, sulfuric acid, ethanesulfonic acid, etc., or to their base addition salts with a pharmaceutically acceptable strong organic or inorganic base, e.g. diethanolammonium hydroxide, or an alkali or alkaline earth hydroxide, carbonate or bicarbonate.

The invention also relates to novel compounds having the formula (II)

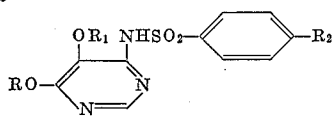

wherein R and $R_1$ have the meaning given above for Formula I, and $R_2$ is an amino group precursor, i.e. either a group which can be converted to an amino group through reduction of hydrolysis, for example, a nitro, nitroso, azo, hydrazo, hydrazido, carbalkoxyamino, carbobenzyloxyamino group, etc., or, preferably, an acylamido group, for example, an alkanoylamido, preferably a lower alkanoylamido, e.g. acetamido, propionylamido, etc., or benzamido, or substituted benzamido.

Compounds of Formula II can be converted into compounds of Formula I by hydrolyzing or reducing the —$R_2$ group to the amino group by standard techniques. For example, when the —$R_2$ group is an acylamido group, removal of the acyl group can be carried out by heating the compound of Formula II in an aqueous alkaline or acid medium. In order to separate the 4-sulfanilamido-5,6-dilower alkoxypyrimidine from an aqueous alkaline saponification medium, the alkaline solution is preferably treated with a concentrated mineral acid, for example HCl, in portions until neutralization is almost obtained. Then, into the resulting solution, which still reacts alkaline to phenolphthalein, carbon dioxide is introduced until a pH of 6 to 7 is obtained.

The novel compounds of Formulas I and II can be prepared by the following processes which also comprise part of the invention:

PROCESS A

A 4,6-dihalo-5-lower alkoxypyrimidine is reacted with ammonia to form 4-amino-5-lower alkoxy-6-halopyrimidine. The halogen atom of the latter compound is replaced with a lower alkoxy group by reaction with an alkali metal alcoholate, e.g. sodium methylate, and the resulting 4-amino-5,6-dilower alkoxypyrimidine is condensed with a benzenesulfonyl halide having an amino group precursor in the p-position whereby compounds of Formula II are obtained.

The step of reacting 4,6-dihalo-5-lower alkoxypyrimidine with ammonia to substitute an amino group for a halogen atom is carried out by the use of ammonia in solution in an inert organic diluent, or, preferably, in undiluted liquid form. A preferred process involves treating a solution of the dihalopyrimidine in dimethylformamide at a temperature of about 80° C. with dry gaseous ammonia. Alternatively, liquid ammonia can be used and the reaction carried out at room temperature in a closed vessel, preferably in a rocking autoclave.

The step of reacting the 4-amino-5-lower alkoxy-6-halopyrimidine with an alkali metal alcoholate is carried out in an alkanolic solution with heating, e.g. with methanolic sodium methylate with boiling under reflux. This reaction can also be carried out in a closed vessel at temperatures above the reflux temperature, up to a temperature of about 140° C. Higher temperatures can be employed but they are not as practical.

The 4-amino-5,6-dilower alkoxypyrimidine is condensed with a sulfonyl halide by known methods, for example, the reaction can be carried out in an inert organic solvent in the presence of usual condensing agents, e.g. pyridine or benzene solution of trimethylamine. By controlling the quantity of sulfonyl halide employed condensation products can be obtained with one or two benzenesulfonyl groups. An equimolar quantity of 4-amino-5,6-dilower alkoxypyrimidine and a sulfonyl halide results in the formation of a monobenzenesulfonyl compound. However, use of molar quantities of 1 to 2 results in the formation of bis-benzenesulfonyl compounds. For example, by the use of 2 moles of p-acetamidobenzenesulfonyl chloride to 1 mole of 4-amino-5,6-dimethoxypyrimidine there is obtained bis(acetamidobenzenesulfonyl)-4-amino-5,6-dimethoxypyrimidine. Hence the invention also relates to bis(acylamidobenzenesulfonyl) - 4 - amino-5,6-dilower alkoxypyrimidines, and the corresponding deacylated compounds, bis(aminobenzenesulfonyl) - 4-amino-5,6-dilower alkoxypyrimidines.

The condensation of the aminopyrimidine compound with a sulfonyl halide compound can be carried out at lower temperatures as well as temperatures up to the boiling point of the reaction mixture, e.g. temperatures ranging from about 0° to about 100° C. When p-acetamidobenzenesulfonyl chloride is employed as the sulfonyl halide component and pyridine is used as the condensing agent it is especially preferred to employ lower temperatures, suitably not exceeding 5° C.

PROCESS B

A 4,6-dihalo-5-lower alkoxypyrimidine is condensed with an alkali metal salt, e.g. the sodium, potassium or lithium salt of sulfanilamide or $N_4$-acyl sulfanilamide, and then a lower alkoxy group is substituted in place of the remaining halogen atom in the condensation product by the use of an alkali metal lower alcoholate to form 4 - sulfanilamido - 5,6 - dilower alkoxypyrimidine. The $N_4$-acyl group can be any acyl group which can be readily split off from the nitrogen atom, for example, an alkanoyl group, preferably a lower alkanoyl group, e.g. acetyl, propionyl, etc., or benzoyl or a substituted benzoyl group. The $N_4$-acyl group can be removed before or during the step of substituting the lower alkoxy group for the halogen atom in the condensation product.

The alkali metal salt of sulfanilamide or $N_4$-acyl sulfanilamide is preferably sodium sulfanilamide or sodium $N_4$-acetyl sulfanilamide.

According to a preferred method for carrying out Process B a 4,6-dihalo-5-alkoxypyrimidine is reacted with an alkali metal salt of sulfanilamide or $N_4$-acyl sulfanilamide in the presence of an inert diluent such as dimethylformamide at a temperature in the range of about 80 to about 120° C., preferably between about 90 and about 100° C., and then the resulting condensation product is heated with an alkali metal alcoholate, e.g. sodium methylate, potassium ethylate, etc., in order to replace the remaining halide group in the condensation product with an alkoxy group, the latter step being carried out preferably under pressure at a temperature above about 100° C. Of course, temperatures so high that they result in decomposition of one or more of the reactants should not be employed. Pressure is employed to obtain the elevated temperatures desired. During the latter reaction the $N_4$-acyl group, if present, is readily split off. Additionally, the $N_4$-acyl group can be removed prior to the reaction with the alkali metal alcoholate, for example, by heating the condensation product with dilute alkali hydroxide, e.g. sodium hydroxide. In a preferred process 4,6-dichloro-5-methoxypyrimidine is reacted with sodium sulfanilamide or sodium $N_4$-acetyl sulfanilamide and the remaining chlorine atom in the resulting condensation product is replaced with a methoxy group by treating the condensation product with a solution of sodium methylate in absolute methanol under pressure at a temperature of about 120–130° C.

As a starting material for the processes of the invention 4,6-dihalo-5-lower alkoxypyrimidines are employed wherein the halogen atoms are chlorine, bromine or iodine, preferably chlorine. The preferred starting material of the invention is 4,6-dichloro-5-methoxypyrimidine.

The 4,6-dihalo-5-lower alkoxypyrimidines are prepared by converting a lower alkoxy acetate to dimethyl alkoxy malonate by means of dimethyl carbonate and the dimethyl lower alkoxy malonate converted with ammonia into lower alkoxymalonamide. The latter compound is treated with formamide in the presence of sodium ethylate to form the sodium salt of 4,6-dihydroxy-5-lower alkoxypyrimidine, which, through halogenation with an inorganic acid halide such as phosphorus oxychloride in the presence of dimethylaniline, is converted to 4,6-dihalo-5-lower alkoxypyrimidine.

The 4-sulfanilamido-5,6-dilower alkoxypyrimidines and their salts and the bis(aminobenzenesulfonyl)-4-amino-5,6-dilower alkoxypyrimidines exhibit antibacterial activity and are useful as enteral germicides, for example in the treatment of bacterial infections such as staphylococci, pneumococci and coli bacilli. 4-sulfanilamido-5,6-dimethoxypyrimidine is particularly active. The above compounds are characterized by having a long duration of activity.

The products of the invention can be incorporated into standard pharmaceutical dosage forms, for example, they are useful for oral or parenteral application with the usual pharmaceutical adjuvant material, e.g. organic or inorganic inert carrier materials such as water, gelatin, lactose, starch, magnesium stearate, talc, vegetable oils, gums, polyalkylene-glycols, Vaseline, etc. The pharmaceutical preparations can be employed in a solid form, e.g. as tablets, troches, suppositories, capsules, or in liquid form, e.g. as solutions, suspensions or emulsions. The pharmaceutical adjuvant material can include preservatives, stabilizers, wetting or emulsifying agents, salts to change the osmotic pressure or to act as buffers. They can also contain other therapeutically active materials. The invention will be understood better by reference to the following examples which are given for illustration purposes only and are not meant to limit the invention.

EXAMPLE 1

(A) *Preparation of 4-amino-5-methoxy-6-chloropyrimidine*

480 g. of 4,6-dichloro-5-methoxypyrimidine and 1700 g. of liquid ammonia are placed in a 5-liter rocking autoclave, 20 atmospheres of nitrogen introduced, and the reaction mixture shaken overnight at room temperature. Then the ammonia is distilled off, the solid residue made into a paste with water, filtered with suction, and dissolved in 2 N hydrochloric acid. The aqueous solution is treated with animal charcoal and then filtered. The filtrate is neutralized with sodium carbonate solution. The precipitated 4-amino-5-methoxy-6-chloropyrimidine is filtered off, washed and dried. Yield 351 g. (82% of theory), M.P. 176–178°.

In an additional run, using liquid ammonia, the yield is 92% of theory and a pure white product of M.P. 179–181° is obtained.

4-amino-5-methoxy-6-chloropyrimidine can also be obtained as follows:

Into a solution of 2.51 g. of 4,6-dichloro-5-methoxypyrimidine and 15 ml. of absolute dimethylformamide dry ammonia gas is introduced over the course of 7 hours at a bath temperature of 80°. The crystallized ammonia chloride is filtered off and the filtrate evaporated at a 60° bath temperature. The residue is taken up in 10 ml. of water, extracted with ethyl acetate, the extract dried and evaporated under vacuum. The residue quickly crystallizes upon digestion with petroleum ether, after which the petroleum ether is filtered off. After sublimation in a bulb tube at a heating bath temperature of 150–170° and a vacuum of 0.5 mm., 1.51 g. (68% of theory) of pure 4-amino-5-methoxy-6-chloropyrimidine of M.P. 175° is obtained. After recrystallization from ether-petroleum ether the M.P. is 178–180°.

4-amino-5-methoxy-6-chloropyrimidine is somewhat soluble in cold water and is soluble in hot water. Furthermore, it is soluble in lower alcohols, ether, and ethyl acetate. It is very slightly soluble in petroleum ether. In dilute mineral acids it dissolves with salt formation.

(B) *4-amino-5,6-dimethoxypyrimidine*

Into a solution of 29.4 g. of sodium and 1070 ml. of absolute methanol 170 g. of 4-amino-5-methoxy-6-chloropyrimidine is introduced. The solution is heated for 18 hours under reflux. Then 800 ml. of methanol are distilled off after which the residue is heated for an additional ½ hour. Thereafter the solution is completely evaporated under vacuum and the residue treated with boiling ether. The undissolved sodium chloride is dissolved in cold water and the aqueous solution extracted with ether. The purified ether solutions are dried, treated with animal charcoal, filtered, and then evaporated to dryness. The residue is soluble in hot isopropyl ether. Upon crystallization from the solvent 155 g. (94% of theory) of 4-amino-5,6-dimethoxypyrimidine of M.P. 88–89° is obtained.

The above compound can also be obtained by methanolysis in a closed vessel as follows:

Into a solution of 0.1 g. of sodium in 5 ml. of absolute methanol, 638 mg. of crude 4-amino-5-methoxy-6-chloropyrimidine is introduced. The mixture is heated for 4 hours at 120–130° in an autoclave and then evaporated in vacuum. The residue is taken up with water and shaken with ethyl acetate. The ethyl acetate solution is evaporated off under vacuum leaving behind a crystalline residue which is then suspended in a little petroleum ether, filtered, and dried. 450 mg. of crude 4-amino-5,6-dimethoxypyrimidine is obtained. After sublimation in a bulb tube (heating bath temperature 100°, vacuum 0.4 mm.) 440 mg. (62% of theory) of a pure white product of M.P. 90–92° (sublimes above 50°) is obtained. The product is sublimed again, M.P. 92–93°.

4-amino-5,6-dimethoxypyrimidine is readily soluble in water, alcohols, ether and ethyl acetate. It is soluble in dilute mineral acids with salt formation.

(C) *4-($N_4$-acetylsulfanilamido)-5,6-dimethoxypyrimidine*

In a 3-neck flask with stirrer, thermometer and calcium chloride tube, 62 g. of 4-amino-5,6-dimethoxypyrimidine dissolved in 160 ml. of absolute pyridine is introduced and into the solution over a 3-hour period 130 g. of p-acetamidobenzenesulfonyl chloride is introduced under cooling with ice so that the reaction temperature does not rise above 2–3°. The solution is stirred during 16 hours at 1–2° and then 350 g. of ice is added while cooling with ice, whereupon the temperature rises to about 9°. Thereafter 250 ml. of the pyridine-water mixture is distilled off under vacuum at 40° bath temperature, whereupon the reaction mixture crystallizes. To the crystalline mixture an additional 200 ml. of water is added and 150 ml. of the resulting mixture distilled off in order to remove as much of the pyridine as possible. The residue is filtered and washed with ice water. The yield of crude 4-($N_4$-acetylsulfanilamido)-5,6-dimethoxypyrimidine is 126 g. (90% of theory), M.P. 216–224°. Upon recrystallization from glacial acetic acid the M.P. is 230–231°.

4-($N_4$-acetylsulfonilamido) - 5,6 - dimethoxypyrimidine can also be obtained from the same starting materials as follows:

1 g. of 4-amino-5,6-dimethoxypyrimidine (6.45 millimoles) and 1.55 g. of p-acetamidobenzenesulfonyl chloride (6.6 millimoles) are dissolved in 6 ml. of absolute pyridine, and heated 1.5 hours under exclusion of moisture on a boiling water bath. The deep red solution is evaporated under vacuum and the residue dissolved in 10 ml. of saturated sodium carbonate solution except for a small resinous impurity. After treatment with animal charcoal and filtering, the filtrate is acidified to pH 5 with acetic acid, yielding a still strongly contaminated precipitate. The precipitate is shaken with ethyl acetate, the ethyl acetate solution dried and evaporated under vacuum, leaving 730 mg. of crude 4-($N_4$-acetylsulfanilamido)-5,6-dimethoxypyrimidine. After recrystallization twice from acetic acid with water (1:1), with addition of animal charcoal, there is obtained a pure white product of M.P. 217–222°. The compound is soluble in dilute alkali metal hydroxides.

(D) *4-sulfanilamido-5,6-dimethoxypyrimidine*

In a 3-neck flask fitted with a stirrer and thermometer a mixture of 126 g. of crude 4-($N_4$-acetylsulfanilamido)-5,6-dimethoxypyrimidine in 1155 ml. of 2 N sodium hydroxide is stirred for 1.5 hours at 83–85°. The resulting clear solution is cooled with ice and about 130 ml. of ice-cold concentrated hydrochloric acid added thereto, the temperature being maintained so that it does not rise over 25°. The resulting solution still reacts clearly alkaline to phenolphthalein. The solution is stirred with animal charcoal and filtered. The clear, almost colorless filtrate is neutralized through introduction of carbon dioxide while cooling with ice, whereupon immediate precipitation of crystalline 4-sulfanilamido-5,6-dimethoxypyrimidine takes place. The introduction of carbon dioxide is continued until the solution shows a pH of 6–7. The white precipitate is filtered off, washed with water and dried in vacuum at 40°. 101 g. (91% of theory) of pure 4-sulfanilamido-5,6-dimethoxypyrimidine of M.P. 201–202° is obtained.

EXAMPLE 2

(A) *Bis-(acetamidobenzenesulfonyl)-4-amino-5,6-dimethoxypyrimidine*

A suspension of 1.55 g. (10 millimoles) of 4-amino-5,6-dimethoxypyrimidine prepared according to the procedure of Examples 1A and 1B and 4.7 g. of p-acetamidobenzenesulfonyl chloride (20.2 millimoles) in 10 ml. of dry methylene chloride are heated with stirring to reflux temperature. To this suspension 7 ml. of a 20% solution of trimethylamine in absolute benzene is added whereupon a clear solution results. In order to compensate for the evolution of trimethylamine, after 1 hour 2 ml. of trimethylamine-benzene solution is added to the reaction mixture. The reaction mixture separates slowly into two layers. After heating for 5 hours under reflux with stirring the mixture is evaporated under vacuum. The residue is digested with water, the crystals obtained thereby filtered off, washed, and dried to yield 2.94 g. (53.5% of theory) of crude bis - (acetamidobenzenesulfonyl)-4-amino-5,6-dimethoxypyrimidine. After trituration with acetone-water the compound is obtained colorless. It begins to decompose with yellow discoloration at 195° without melting completely until 230°. The compound is insoluble in dilute alkali hydroxide in the cold.

(B) *4-sulfanilamido-5,6-dimethoxypyrimidine*

2.94 g. of the so-obtained crude bis-(acetamidodbenzenesulfonyl)-4-amino-5,6-dimethoxypyrimidine is suspended in 20 ml. of 10% sodium hydroxide solution and heated under reflux. After 15 minutes the mixture is almost completely in solution. After 1.5 hours animal charcoal is added, the solution filtered warm, and the cooled filtrate acidified to pH 5 with glacial acetic acid. The amorphous white precipitate obtained thereby, which quickly crystallizes upon digestion, is filtered after standing for 1 hour in the cold, washed with water, and then dried. 1.01 g. (61% of theory) of 4-sulfanilamido-5,6-dimethoxypyrimidine of M.P. 195–198° are obtained.

EXAMPLE 3

(A) *4-sulfanilamido-5-methoxy-6-chloropyrimidine*

42.7 g. of sodium sulfanilamide (0.22 mole) is introduced in small portions into 140 ml. of absolute dimethylformamide. The resulting slurry is heated with stirring to 95°, then 19.7 g. (0.11 mole) of 4,6-dichloro-5-methoxypyrimidine is added portionwise with stirring. The reaction which takes place rapidly is exothermic. Therefore care is exercised so that the temperature of reaction mixture remains at 90–100° C. After addition of the pyrimidine compound is completed the reaction mixture is kept at 90° for another 5 minutes with stirring. Three hours heating on a boiling water bath under exclusion of moisture completes the reaction. Thereafter the solvent is removed as completely as possible by distillation under vacuum leaving behind a brown crystalline residue which, when triturated with 60 ml. of water, goes into solution to a large extent. The main part of the sulfanilamide, which is added in excess, precipitates after a short time and is filtered off, washed with a little water and dried. The brown-colored filtrate is acidified with glacial acetic acid to pH 6, whereupon the 4-sulfanilamido-5-methoxy-6-chloropyrimidine precipitates as a viscous oil. Decanting and triturating the precipitate with a little aqueous alcohol quickly brings about crystallization; yield 21.9 g. (84% of thoory), M.P. 189–198° C. For purification 15 g. of this product is dissolved in 250 ml. of acetic acid-water (1:1) with heating. Five g. of animal charcoal is added thereto and the mixture heated for 10 minutes on a hot water bath. After rapid filtration, 4-sulfanilamido-5-methoxy-6-chloropyrimidine crystallizes out in completely colorless platelets. Yield of pure material 12.4 g. (69.5% of theory based on 4,6-dichloro-5-methoxypyrimidine). The material which crystallizes in platelets is a labile modification which, with partial melting, converts to prisms and needles at 190°. The latter crystalline modification melts at 198–202° with decomposition. An additional recrystallization from ethanol-water (1:1) gives a product melting at 200–202° which after drying at 110°/0.5 mm. analyzes pure.

The pure white, completely odorless 4-sulfanilamido-5-methoxy-6-chloropyrimidine is slightly soluble in water and ether, somewhat soluble in hot water, and soluble in alcohol and acetone. In alkali, such as sodium carbonate and bicarbonate solution, it is soluble with salt formation; it is also soluble with salt formation in strong mineral acid solutions.

4,6-dichloro-5-methoxypyrimidine used as a starting material is a new compound which can be prepared as follows:

16.1 g. of formamidine hydrochloride (0.2 mole) is introduced into a solution of 13.8 g. of sodium (0.6 g.

atom) and 200 ml. of absolute methanol cooled by ice. In an instant sodium chloride precipitates in very fine form as a sediment. After addition of 32.4 g. of dimethylmethoxymalonate (0.2 mole) the mixture is kept for ½ hour in an ice bath with exclusion of moisture and allowed to stand an additional 48 hours at room temperature, whereupon the sodium salt of 4,6-dihydroxy-5-methoxypyrimidine precipitates copiously as a white, dense crystallizate. This is filtered off, the filtrate brought to dryness under vacuum and the crystalline residue washed with ether and dried at 110°.

The finely pulverized material is introduced in small portions with cooling in an ice bath into 170 ml. of phosphorus oxychloride, whereupon a vigorous reaction takes place with strong heating of the mixture. After the addition of 15 ml. of dimethylaniline, the mixture is heated for 1 hour under reflux whereupon the largest portion of the solid materials goes into solution.

Most of the excess phosphorus oxychloride is distilled off under vacuum and the brown syrupy residue poured with stirring onto 200 g. of finely crushed ice. The 4,6-dichloro-5-methoxypyrimidine precipitates after a short time in the form of little red-colored needles and the strongly acidic aqueous phase (pH 1) extracted with ether with shaking. The combined organic phases are washed free of acid with sodium bicarbonate, dried and concentrated at a bath temperature of 40–50°. The oil which remains after the evaporation solidifies upon cooling and rapid rubbing to yield 28.9 g. of only slightly colored 4,6-dichloro-5-methoxypyrimidine. This is sufficiently pure for further reaction, M.P. 53–58°; sublimes at 40°; yield 81% of theory. Sublimation at 60–80° heating bath temperature at 0.5 ml. yields a white material of M.P. 57–58° which analyzes pure.

The above compound is very slightly soluble in cold or hot water but is soluble in lower alcohols, ethyl acetate, ether, benzene, and petroleum ether. At room temperature it is quite volatile and produces a lasting strong irritating effect on the skin and eyes.

*(B) 4-sulfanilamido-5,6-dimethoxypyrimidine*

15.75 g. of pure 4-sulfanilamido-5-methoxy-6-chloropyrimidine (0.05 mole) is introduced into a solution of 5.75 g. of sodium (0.25 g. atom) in 100 ml. of absolute methanol and heated in an autoclave for 4 hours at 125°. After cooling the solvent is removed under vacuum and the yellow foamy resin remaining behind taken up in 50 ml. of water. After treatment with animal charcoal a clear yellow filtrate is obtained which, upon acidification with acetic acid, precipitates amorphous 4-sulfanilamido-5,6-dimethoxypyrimidine. The latter, upon rubbing, quickly crystallizes. After filtration and drying under vacuum an almost colorless product is obtained, M.P. 182–190°.

For purposes of purification the above compound is dissolved in about 150 ml. of hot acetic acid-water (1:1), treated with animal charcoal, quickly filtered, and the filtrate allowed to crystallize. 10.6 g. of pure white 4-sulfanilamido-5,6-dimethoxypyrimidine of M.P. 190–194° is obtained (yield 78.2% of theory). The pure white, completely odorless compound is sligthly soluble in cold water and ether, is somewhat soluble in alcohol, more so in acetone, quite soluble in alkali as well as in sodium carbonate and bicarbonate solution with salt formation, and soluble with salt formation in strong mineral acids.

EXAMPLE 4

*(A) 4-($N_4$-acetylsulfanilamido)-5-methoxy-6-chloropyrimidine*

2.36 g. of sodium $N_4$-acetylsulfanilamide (0.01 mole) is stirred with 7 ml. of absolute dimethylformamide into the form of a slurry. After heating to 95°, 0.895 g. of 4,6-dichloro-5-methoxypyrimidine (0.005 mole) is added portionwise with stirring and the temperature of the reaction mixture maintained between 90–100°. Five minutes after the addition is ended the mixture, which becomes watery, is heated for 1 hour on a boiling water bath under exclusion of moisture whereupon the greatest portion of the solid material goes into solution. The diluent is completely distilled off under vacuum to leave behind a syrupy brown residue which is then rubbed with a little water, resulting in the precipitation of most of the excess $N_4$-acetylsulfanilamide as a colorless crystallizate which is then removed by filtration. The filtrate is brought to pH 5 with 50% acetic acid whereupon 4-($N_4$-acetylsulfanilamido)-5-methoxy-6-chloropyrimidine precipitates as a gummy substance which quickly crystallizes with rubbing. The slightly yellow product is filtered and weighs after drying under vacuum 1.65 g. (92.5% of theory). Recrystallization from methanol (charcoal) results in a pure white product that melts at 210–212° (198° conversion). The pure white, odorless compound is very slightly soluble in water and alcohol and soluble in alkali and sodium carbonate solutions.

*(B) 4-sulfanilamido-5-methoxy-6-chloropyrimidine*

150 mg. of 4-($N_4$-acetylsulfanilamido)-5-methoxy-6-chloropyrimidine is dissolved in 10 ml. of 0.5 N sodium hydroxide solution and heated 4.5 hours on a boiling water bath. The solution is then treated for 10 minutes with animal charcoal, filtered hot, and then treated with 50% acetic acid. 4-sulfanilamido-5-methoxy-6-chloropyrimidine precipitates which is filtered after standing for 1 hour in the refrigerator. The precipitate is washed with water and dried under vacuum. Yield of crude material 100 mg. (75.8% of theory), M.P. 196–198° (dec.).

*(C) 4-sulfanilamido-5,6-dimethoxypyrimidine*

0.35 g. of sodium (about 0.015 g. atom) is dissolved in 8 ml. of absolute methanol and 1.07 g. of crude 4-($N_4$-acetylsulfanilamido)-5 - methoxy - 6 - chloropyrimidine (0.003 mole) added thereto. The mixture is kept for 3 hours at 115–125° in a glass autoclave, after which the solvent is distilled off and the resulting residue taken up in 10 ml. of water. After treatment with animal charcoal on a boiling water bath the mixture is filtered and acidified with 50% acetic acid whereupon 4-sulfanilamido-5,6-dimethoxypyrimidine precipitates in amorphous form. Decantation and digestion with a little aqueous alcohol quickly results in crystallization. After allowing the mixture to stand for 1 hour in the refrigerator the crude product is filtered, dried under vacuum and weighs 760 mg. (82.5% of theory), M.P. 172–187°.

The compound which is soluble in mineral acids is recrystallized twice from methanol-water (4:1) (animal charcoal added) and melts at 192–194° (standard).

Variations in the process of the invention can be undertaken by those skilled in the art without departing from the scope or spirit of the invention.

We claim:

1. A compound selected from the group consisting of 4-sulfanilamido-5,6-dilower alkoxypyrimidine and addition salts thereof with pharmaceutically acceptable acids and bases.

2. A compound selected from the group consisting of 4-sulfanilamido-5-lower alkoxy-6-halopyrimidine and addition salts thereof with pharmaceutically acceptacle acids and bases.

3. A compound selected from the group consisting of 4-($N_4$--acylsulfanilamido)-5-lower alkoxy-6-halopyrimidine and addition salts thereof with pharmaceutically acceptable acids and bases wherein said $N_4$-acyl group is selected from the group consisting of lower alkanoyl and benzamido.

4. 4-($N_4$-acylsulfanilamido)-5,6-dilower alkoxypyrimidine wherein said acyl group is selected from the group consisting of lower alkanoyl and benzamido.

5. 4-($N_4$-acetylsulfanilamido) - 5,6 - dimethoxypyrimidine.

6. 4-sulfanilamido-5,6-dimethoxypyrimidine.

7. An acid additional salt of 4-sulfanilamido- 5,6-dimethoxypyrimidine with a pharmaceutically acceptable acid.

8. A base addition salt of 4-sulfanilamido-5,6-dimethoxypyrimidine with a pharmaceutically acceptable base.

9. 4-sulfanilamido-5-methoxy-6-chloropyrimidine.

10. An acid addition salt of 4-sulfanilamido-5-methoxy-6-chloropyrimidine with a pharmaceutically acceptable acid.

11. A base addition salt of 4-sulfanilamido-5-methoxy-6-chloropyrimidine with a pharmaceutically acceptable base.

12. 4-($N^4$-acetylsulfanilamido)-5-methoxy-6-chloropyrimidine.

13. An acid addition salt of 4-($N^4$-acetylsulfanilamido)-5-methoxy-6-chloropyrimidine with a pharmaceutically acceptable acid.

14. A base addition salt of 4-($N^4$-acetylsulfanilamido)-5-methoxy-6-chloropyrimidine with a pharmaceutically acceptable base.

References Cited by the Examiner

UNITED STATES PATENTS

| | | | |
|---|---|---|---|
| 2,430,439 | 11/1947 | Winnek et al. | 260—349.75 |
| 2,487,569 | 11/1949 | Mackey | 260—256.4 |
| 2,616,894 | 11/1952 | Derbyshire | 260—256.4 |
| 2,703,800 | 3/1955 | Bretschneider et al. | 260—239.75 |
| 2,712,012 | 6/1955 | Clark | 260—239.75 |
| 2,871,240 | 1/1959 | Randall et al. | 260—256.4 |
| 2,947,743 | 8/1960 | Hoffe | 260—239.75 |
| 2,980,678 | 4/1961 | Langley | 260—256.4 |
| 3,082,206 | 3/1963 | Langley | 260—239.75 |
| 3,091,610 | 5/1963 | Bretschneider et al. | 260—239.75 |

FOREIGN PATENTS

| | | |
|---|---|---|
| 183,756 | 11/1955 | Austria. |
| 588,170 | 9/1960 | Belgium. |
| 926,131 | 4/1955 | Germany. |

WALTER A. MODANCE, *Primary Examiner.*

IRVING MARCUS, NICHOLAS RIZZO, *Examiners.*

JAMES W. ADAMS, EGON E. BERG, JOHN D. RANDOLPH, *Assistant Examiners.*